United States Patent [19]

Lyons et al.

[11] Patent Number: 5,574,505
[45] Date of Patent: Nov. 12, 1996

[54] METHOD AND APPARATUS FOR OPERATING A TRANSPORT STREAM ENCODER TO PRODUCE A STREAM OF PACKETS CARRYING DATA REPRESENTING A PLURALITY OF COMPONENT SIGNALS

[75] Inventors: Paul W. Lyons, New Egypt, N.J.; Alfonse A. Acampora, Staten Island, N.Y.; Nicola J. Fedele, Kingston; Victor V. D'Alessandro, Berkleley Heights, both of N.J.

[73] Assignee: Thomson multimedia S.A., Courbevoie, France

[21] Appl. No.: 442,429

[22] Filed: May 16, 1995

[51] Int. Cl.$^6$ .................................................. H04N 7/24
[52] U.S. Cl. ............................................. 348/426; 348/465
[58] Field of Search .................................. 348/426, 399, 348/340, 423, 467, 461, 465, 2/24

[56] References Cited

U.S. PATENT DOCUMENTS

| | | | |
|---|---|---|---|
| 5,111,292 | 5/1992 | Joseph et al. | 358/133 |
| 5,115,309 | 5/1992 | Hang | 358/133 |
| 5,365,272 | 11/1994 | Siracusa | 348/425 |
| 5,455,629 | 10/1995 | Sun et al. | 348/426 |
| 5,504,823 | 4/1996 | Yoon | 348/399 |
| 5,510,844 | 4/1996 | Cash et al. | 348/426 |
| 5,517,250 | 5/1996 | Hougenboom et al. | 348/467 |

*Primary Examiner*—Victor R. Kostak
*Attorney, Agent, or Firm*—Joseph S. Tripoli; Eric P. Herrmann; Ronald H. Kurdyla

[57] ABSTRACT

A method and apparatus are disclosed for operating a transport stream encoder to produce a stream of packets carrying data representing a plurality of component signals which comprises the following steps. The packet stream is partitioned into successive groups, each group containing a predetermined number of packet slots. A plurality of priority lists is maintained, one for each of the packet slots in the group. Each priority list contains a plurality of entries, and each entry identifies one of the component signals. When a packet slot is to be produced, the entries in the priority list corresponding to that packet slot are traversed, one at a time. For each of those entries it is determined whether the component signal identified by that entry can produce a packet. If it can, a packet containing data representing that component signal is produced. Only if none of the component signals identified by the entries in the priority list can produce a packet is a null packet produced.

17 Claims, 2 Drawing Sheets

METHOD AND APPARATUS FOR OPERATING A TRANSPORT STREAM ENCODER TO PRODUCE A STREAM OF PACKETS CARRYING DATA REPRESENTING A PLURALITY OF COMPONENT SIGNALS

FIELD OF THE INVENTION

The present invention relates to a method for operating a transport stream encoder to produce a stream of packets carrying data representing a plurality of component signals. In particular, the invention concerns a method which allows flexibility in the assignment of component signals to packet slots, and minimizes the number of null packets which are inserted into the packet stream.

BACKGROUND OF THE INVENTION

In present high definition television (HDTV) and satellite broadcast systems, programs comprise combinations of a video signal representing a moving image, one or more audio signals (for stereo or multi-language capability), and one or more data signals (for closed captioning, and/or interactive computer program code and/or data). As a specific example, a system proposed by the Grand Alliance consortium in the United States provides for a program to contain a video signal component, two audio signal components and four auxiliary data signal components. A stream of successive packets of data is formed, each packet containing data from one of the component signals. In this manner the seven component signals are time multiplexed into a single packet stream, which is broadcast over a transport link.

Remote locations receive and process the data contained in the packet stream to reproduce the seven component signals. The image represented by the video signal component is displayed on a display screen, and the sound represented by the audio signal component(s) is reproduced by speakers. The auxiliary data component signals are processed by appropriate circuitry at the remote location, and used as intended. For example, if one of the auxiliary data component signals represents closed captioning information, a video signal representing the closed caption image is generated, and that image signal is combined with the image signal representing the video signal component. The image represented by the combined image signals is displayed on the display screen.

The device used to combine the seven component signals is called a transport stream encoder. A working draft published by the International Organization for Standardization, ISO/IEC JTC1/SC29/WG11, Coding of Moving Pictures and Associated Audio, entitled "MPEG-2 Systems Working Draft," (ISO/IEC/JTC1/SC29/WG11/N0531) in September 1993, illustrates a block diagram of a transport stream encoder. This block diagram includes an input FIFO and data selector for temporarily buffering data representing the seven digital data signal components and producing data representing a selected one of the seven signal components. This data is supplied to a packetizer. A scheduler selects which of the signal components is to be carried in the next packet slot using either a priority scheme or a fixed time slot scheme, both of which are described in more detail below. To form a packet containing data from a selected signal component, the scheduler conditions the data selector to couple the output terminal of the input FIFO for the selected signal component to the packetizer, and conditions that input FIFO to produce the data to be carried in that packet. The resulting packet is transmitted over the transport link.

In the known priority scheme, a list of the component signals is maintained in order from a highest priority component signal to a lowest. Each time a packet is prepared, the FIFOs of the component signals are tested in order from the highest to the lowest priority component signal. The first FIFO tested which has sufficient data to form a packet is selected to form the next packet. If none of the FIFOs contain enough data, a null packet is inserted. This is the scheme used in the system illustrated by the Grand Alliance Consortium, described above.

A problem with the priority scheme is it requires low data rate component signals be assigned higher priorities than higher data rate component signals. This is because higher data rate signal components (e.g. video signal components) will accumulate enough data in its FIFO to form a packet more rapidly than lower data rate signal components (e.g. audio signal components), and if they were given a higher priority, no lower data rate component signal would be allowed to form a packet. Furthermore, in the case where more than one program is being transported, more than one set of high data rate and low data rate component signals are being transported. For example, there may be two audio signals per program from more than one program. While all of the audio signals are approximately the same data rate, and equally important, one must be given a priority over the others. Finally, the priority scheme can lead to unnecessary null packets.

In the known fixed time slot scheme, the packet stream is partitioned into successive groups of packet slots. Each component signal is assigned to one or more predetermined packet slots within this group. Whenever a packet slot assigned to a particular component signal is due to be formed, that component signal's FIFO is checked to determine if it contains enough data to form a packet. If it does, a packet is formed containing that data. If it does not, a null packet is inserted into the packet stream.

A problem with the fixed time slot scheme is that component signals are assigned to only specific packet slots within any group of packet slots. At worst, a component signal may be assigned only one packet slot within the group (although a component signal can be assigned more than one packet slot). If that component's FIFO does not have enough data to form a packet when its packet slot occurs, a null packet is inserted into the packet stream and the component signal must wait until the next group, even though it may have had enough data at the very next packet slot. A solution to this problem is to use very small packets, but this increases the overhead in the packet stream, thus, decreasing the overall data rate available to the component signals. Furthermore, a null packet is inserted into the packet stream, even though some other component signal may have sufficient data in its FIFO to form a packet.

Both of the above schemes lack sufficient flexibility to allow effective throughput control while maximizing channel efficiency by minimizing null packets.

SUMMARY OF THE INVENTION

It is herein recognized as desirable to provide a scheme for allocating component signals to packet slots which allows flexibility in the assignment of component signals to packet slots, and minimizes the number of null packets which are inserted into the packet stream.

In accordance with principles of the present invention, a method for operating a transport stream encoder to produce a stream of packets carrying data representing a plurality of component signals comprises the following steps. The packet stream is partitioned into successive groups, each group containing a predetermined number of packet slots. A plurality of priority lists is maintained, one for each of the packet slots in the group. Each priority list contains a plurality of entries, and each entry identifies one of the component signals. When a packet slot is to be produced, the entries in the priority list corresponding to that packet slot are traversed, one at a time. For each of those entries it is determined whether the component signal identified by that entry can produce a packet. If it can, a packet containing data representing that component signal is produced. Only if none of the component signals identified by the entries in the priority list can produce a packet is a null packet produced.

Apparatus in accordance with principles of the present invention comprises a plurality of buffers coupled to sources of component signals. Each buffer has an output terminal producing a full signal indicating whether it contains sufficient data to produce a packet. A packetizer is coupled to the buffers and produces a packet stream partitioned into successive groups, each group containing a predetermined number of packet slots. A memory stores a plurality of priority lists, one corresponding to each packet slot within the group. Each priority list contains a plurality of entries, each identifying a component signal. A scheduler controller is coupled to the buffers and the memory. The scheduler controller determines the contents of each of the packet slots. It does this by traversing the entries in the priority list corresponding to that packet slot, one at a time. For each of the entries, it senses the full signal from the buffer coupled to the source of the component signal identified by that entry. If the full signal indicates that that buffer contains sufficient data to produce a packet, the scheduler controller conditions the packetizer to produce a packet containing data representing that component signal. Only if none of buffers identified by entries in the priority list contain sufficient data to produce a packet is the packetizer conditioned to produce a null packet.

DETAILED DESCRIPTION

Figure 1:
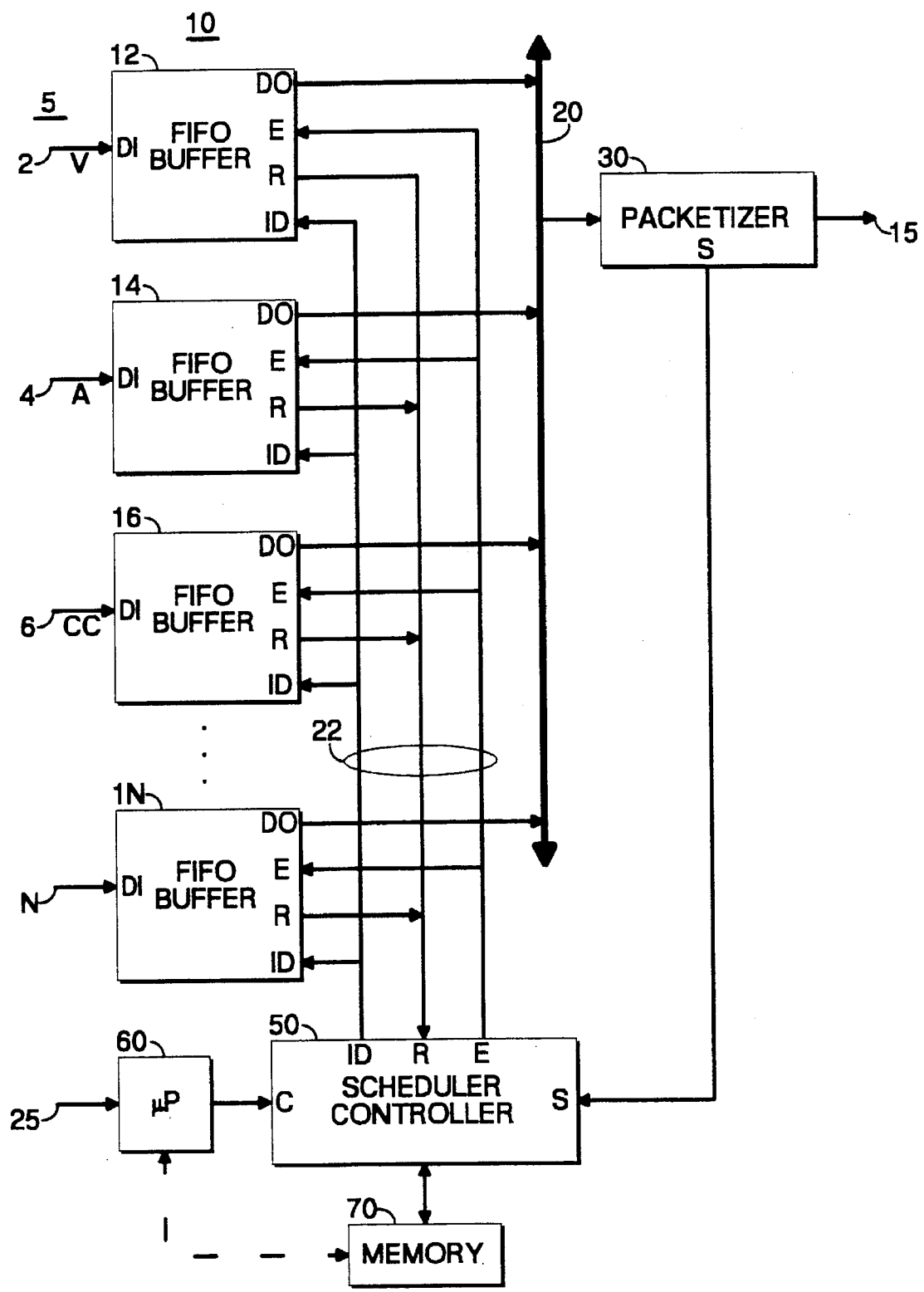
FIG. 1 is a block diagram of a transport stream encoder according to the present invention.

FIG. 1 is a block diagram of a transport stream encoder according to the present invention. In FIG. 1, the illustrated signal lines represent single or multiple bit digital signal lines. Other signals, such as clock and control signals, and other components, such as clock generators and synchronizers, are not illustrated in order to simplify the figure. Although not illustrated, one skilled in the art of digital system design will understand what signals are required, and how to generate and distribute them to appropriate locations in the system.

In FIG. 1, one or more program sources (not shown), produce a plurality N of digital signal components, respectively coupled to a corresponding plurality of input terminals 5. The program sources may include data compressing networks such as MPEG encoders. First, second and third signal components are respectively coupled to input terminals 2, 4 and 6. An Nth signal component is coupled to an input terminal N. In FIG. 1, the signal components represent an HDTV or satellite TV program: the first, second and third signal components, coupled to input terminals 2, 4 and 6, represent a video signal V, audio signal A and closed captioning information signal CC,, respectively. Such program sources, their operation, and the video, audio and digital data signals they produce, are well known and will not be described in detail.

The plurality of input terminals 5 are respectively coupled to data input terminals DI of a corresponding plurality of FIFO buffers 10. The input terminals 2, 4, 6 and N are coupled to respective data input terminals DI of respective FIFO buffers 12, 14, 16 and 1N. Respective data output terminals DO of the FIFO buffers 12, 14, 16 and 1N are coupled in common to a data bus 20. The data bus 20 is also coupled to a data input terminal of a packetizer 30. An output terminal of the packetizer 30 is coupled to an output terminal 15. The output terminal 15 is coupled to the transport link (not shown) for processing the packet stream and broadcasting it to remote locations. The transport link, and its operation, are well known and will not be described in detail. The transport link may include transmission processing networks such as coding, spectrum shaping and modulator networks.

A scheduler controller 50 includes a ready signal input terminal R, and identifier signal ID and enable signal E output terminals. The respective ready output terminals R of each of the plurality of FIFO buffers 10 are coupled in common to the ready input terminal R of the scheduler controller 50. The identifier output terminal ID of the scheduler controller 50 is coupled in common to the respective identifier input terminals ID of each of the plurality of FIFO buffers 10, and the enable output terminal E of the scheduler controller 50 is coupled in common to the respective enable input terminals E of each of the plurality of FIFO buffers 10. The signal lines coupling together the ready R, identifier ID and enable E terminals form a control bus 22, which operates in conjunction with the data bus 20. A start signal output terminal S of the packetizer 30 is coupled to a start signal input terminal of the scheduler controller 50. A memory 70 is coupled to the scheduler controller 50.

A user input terminal 25, which may be coupled to a source of user input, such as a computer terminal (not shown) is coupled to an input port of a microprocessor (μP) 60. The μP 60 has a control output port coupled to a control input terminal C of the scheduler controller 50. In one embodiment, the scheduler controller 50 may be constructed as a standalone controller in a known manner. In this embodiment, the scheduler controller 50 is coupled directly to the memory 70 and includes its own processor which receives only control information from the μP 60, and controls the storage of information to and the retrieval of information from the memory 70. In a second embodiment, the scheduler controller 50 operates as an I/O adapter coupled to the system bus (not shown) of the μP 60. In this embodiment, the scheduler controller 50 is operated under the control of a program executing on the μP 60. The memory 70 is coupled to the system bus (not shown) of the μP 60, as illustrated in phantom in FIG. 1, and the μP 60 controls the storage of information to and the retrieval of information from the memory 70.

In operation, the packetizer 30 produces a stream of sequential packets. Each packet contains data from one of the component signals, or, if there is not enough data in that component's FIFO at the time the packet is formed, a null packet. The packet stream is divided into successive groups of packet slots, each group having a predetermined number of packet slots. The scheduler controller 50 controls which signal component is inserted into each packet slot. In a manner to be described in more detail below, the scheduler controller 50 contains a set of lists of permissible signal components, one list for each packet slot. The set of lists are stored in a memory associated with the scheduler controller 50. If the scheduler controller 50 is operated as an I/O adapter of µP 60, then the set of lists is stored in the RAM (not shown) in the µP 60, otherwise, the scheduler controller 50 contains its own memory to contain this set of lists. Regardless of where they are stored, the contents of this set of lists is maintained by input from a user input terminal 25 via the µP 60 in a known manner.

Each FIFO buffer 10 has a predetermined unique address or identification value associated with it, and the scheduler controller 50 maintains, as a part of its lists of permissible signal components, described above, the identification value of each FIFO buffer 10 in its list. When it is time to fill a packet slot, the list of permissible signal components for that packet slot is traversed. The scheduler controller 50 places an identification signal containing the predetermined unique identification value for the first signal component's FIFO buffer 10 on the ID signal line. This identification signal is received by the ID input terminals of all the FIFO buffers 10 in common. If the identification signal received at the ID input terminal of a FIFO buffer 10 matches its own identification value, it generates a ready signal at the ready output terminal R indicating whether there is sufficient data in the FIFO to fill a packet; otherwise, the identification signal is ignored, and the FIFO buffer 10 remains dormant.

The scheduler controller 50 receives the ready signal at its ready input terminal R. If the ready signal indicates that there is not sufficient data in the addressed FIFO buffer 10 to form a packet, then the next entry in the list of permissible signal components is accessed, and an identification signal having the predetermined unique identification value associated with that next entry is placed on the identification signal lines, and it's ready signal is similarly analyzed. This process repeats until either a FIFO buffer 10 is found which has sufficient data to form a packet, or there are no more entries in the list.

The packetizer 30 generates a start signal at its start output terminal S to indicate the start time of a packet slot. If a FIFO buffer 10 was found which has enough data to form a packet, then when the start signal is received by the scheduler controller 50, an enable signal is produced at its enable output terminal E. The addressed FIFO buffer 10 responds to the enable signal, while the other, non-addressed, FIFO buffers 10 ignore it, and remain dormant. In response to the enable signal, the data output terminal DO of that FIFO buffer 10 is enabled, and the data from the FIFO buffer 10 is supplied to the data bus 20. The packetizer 30 receives this data from the data bus 20, and generates a packet containing that data. While the packetizer 30 is generating the packet, the scheduler controller 50 is testing the plurality of FIFO buffers 10 to determine the contents of the next packet slot. If, however, none of the FIFO buffers 10 on the list have sufficient data to fill a packet, then a null packet is produced for that packet slot.

Figure 2:
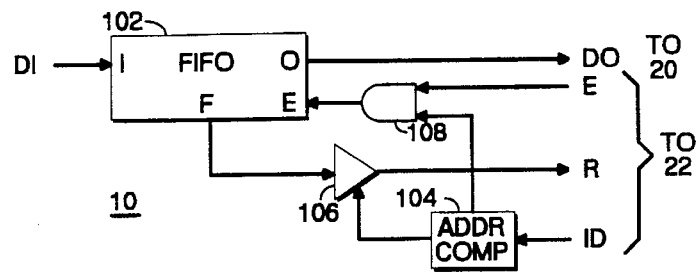
FIG. 2 is a more detailed block diagram of a FIFO buffer which is used in the transport stream encoder of FIG. 1.

FIG. 2 is a more detailed block diagram of a FIFO buffer 10 used in the transport stream encoder illustrated in FIG. 1. In FIG. 2, signal lines represent single or multiple bit digital signals. Other components and signals, e.g. for synchronization and/or clocking, are not illustrated in order to simplify the figure. One skilled in the art of digital circuit design will understand what components and signals are required, and how to design and interconnect them to the illustrated components.

In FIG. 2, the data input terminal DI of the FIFO buffer 10 is coupled to an input terminal I of a FIFO 102. An output terminal 0 of the FIFO 102 is coupled to the data output terminal DO of the FIFO buffer 10. The identifier input terminal ID is coupled to an address input terminal of an address comparator 104. A first output terminal of the address comparator 104 is coupled to an enable input terminal of a buffer/driver 106, and a second output terminal of the address comparator 104 is coupled to a first input terminal of a two input AND gate 108. A full output terminal F of the FIFO 102 is coupled to a data input terminal of the buffer/driver 106. A data output terminal of the buffer/driver 106 is coupled to the ready output terminal R of the FIFO buffer 10. The enable input terminal E of the FIFO buffer 10 is coupled to the second input terminal of the AND gate 108. The output terminal of the AND gate 108 is coupled to an output enable input terminal of the FIFO 102.

In operation, the address comparator 104 receives the identification signal from the ID output terminal of the scheduler controller 50 (of FIG. 1) via the control bus 22. This received identification signal is compared to the predetermined unique identification assigned to this FIFO buffer 10 in the address comparator 104 in a known manner. If the received identification signal is the same as the identification of this FIFO buffer 10, then the signals at the first and second output terminals of the address comparator 104 have a first state indicating that this FIFO buffer 10 is being addressed. Otherwise the signals at the first and second output terminals of the address comparator 104 have a second state-indicating that this FIFO buffer is not being addressed. One skilled in the art of digital system design will understand that each FIFO buffer 10 may be preassigned any identifier, without regard to physical or logical location on the data bus 20, provided that they are mutually different from those assigned to the other FIFO buffers 10.

The FIFO 102 receives data at its input terminal I, and temporarily stores it internally, in a known manner. The signal at the full output terminal F gives an indication of the amount of data currently stored in the FIFO 102, also in a known manner. If there is sufficient data in the FIFO 102 for the packetizer 30 (of FIG. 1) to form a packet, the signal at the full output terminal F has a first state, otherwise it has a second state. When the FIFO buffer 10 is addressed by the scheduler controller 50, the signal at the enable input terminal of the buffer/driver 106 from the address comparator 104 conditions the buffer/driver 106 to pass the signal from the full output terminal F of the FIFO 102 to the ready output terminal R of the FIFO buffer 10. When the FIFO buffer 10 is not addressed, the signal at the enable input terminal of the buffer/driver 106 conditions the buffer driver 106 to place its output terminal in a high impedance state, essentially disconnecting the FIFO buffer 10 from the control bus 22. In this manner, only the addressed FIFO buffer 10 places a signal on the ready line R of the control bus 22.

The FIFO 102 will produce the data currently stored internally at its data output terminal O when enabled by an appropriate signal at its enable input terminal E. When the FIFO buffer 10 is addressed, the signal from the address comparator 104 to the first input terminal of the AND gate 108 is a logic '1' signal. This conditions the AND gate 108 to pass the signal at its second input terminal, from the enable input terminal E of the FIFO buffer 10, to its output terminal, and, thus, to the enable input terminal E of the FIFO 102. When the FIFO buffer 10 is not addressed, the signal from the address comparator 104 is a logic '0' signal. This conditions the AND gate 108 to produce a signal logic '0' signal at its output terminal, which disables the output terminal O of the FIFO 102. In this manner, only the addressed FIFO buffer 10 will produce data at its data output terminal DO when enabled by the scheduler controller 50 (of FIG. 1).

Figure 3:
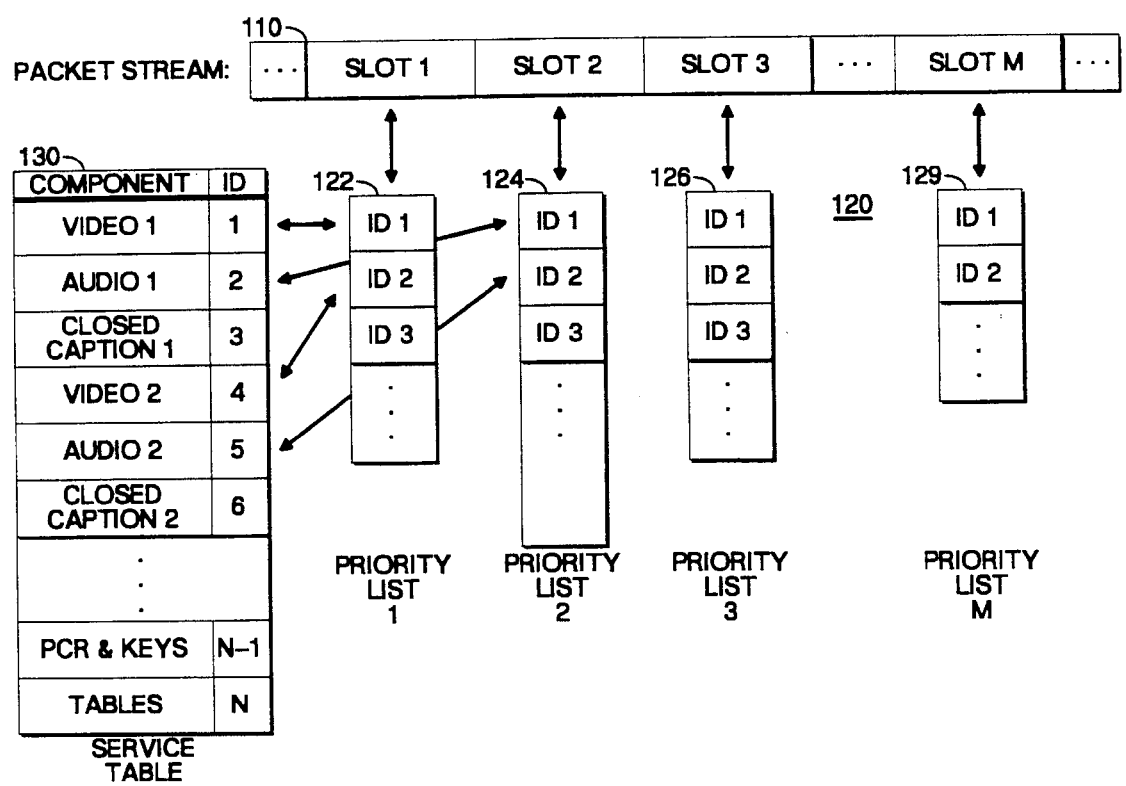
FIG. 3 is a memory layout diagram illustrating a set of tables maintained in the scheduler controller for allocating packet slots to component signals.

The technique used by the scheduler for selecting which component signal is inserted into the next packet is a hybrid between a priority scheme and a fixed time slot scheme. FIG. 3 is a memory layout diagram illustrating a set of tables, described above, maintained in the scheduler controller 50 for allocating data representing component signals to packet slots. In FIG. 3, a portion of a packet stream 110 produced by packetizer 30 (of FIG. 1) is illustrated at the top of the figure. Each packet in the illustrated portion of the packet stream 110 is represented by a rectangle. The packet stream 110 is partitioned into groups each containing a fixed predetermined number M of packet slots: slot 1, slot 2, slot 3 through slot M. This group of packet slots continually repeats in the packet stream 110. That is, the packet immediately following the illustrated slot M is slot, 1 of the next group.

A service table 130 contains an entry for each of the component signals being broadcast by the broadcast system. Each entry contains a description of the component signal and an identifier ID. In the illustrated service table 130, the first entry VIDEO 1 represents the video component of the first program, and has the identifier 1. The second entry AUDIO 1 represents the audio component of the first program and has the identifier 2, and the third entry CLOSED CAPTION 1 represents the closed caption information for the first program and has the identifier 3. Similarly the fourth, fifth and sixth entries in service table 130 (VIDEO 2, AUDIO 2, CLOSED CAPTION 2) represent the video, audio and closed caption information for a second program and have the identifiers 4, 5 and 6, respectively. Finally, entries are provided for component signals generated by the broadcast system itself. For example, the entry having the identifier N−1 represents a signal component carrying a program clock reference signal and encryption keys; and the entry having the identifier N represents a signal component carrying various system tables (e.g. the service table).

Referring back to FIG. 1 and FIG. 2, in the illustrated embodiment the identifier in each entry in the service table 130 refers to the preassigned identification of the FIFO buffer 10 carrying the associated component signal. Thus, the entry having the identifier 1 (VIDEO 1) refers to the video signal component V coupled to the topmost FIFO buffer 12 which, in the illustrated embodiment, has the preassigned identification of "1"; the entry having the identifier 2 (AUDIO 1) refers to the audio signal component A coupled to FIFO buffer 14 Which has the preassigned identification of "2"; and the entry having the identifier 3 (CLOSED CAPTION 1) refers to the closed caption signal component CC coupled to FIFO buffer 16 with the preassigned identification of "3". The entries having identifiers 4, 5 and 6 refer to similar video, audio and closed caption signal components from a second program source (not shown).

Each packet slot in the packet stream 110 has a priority list associated with it. This is illustrated in FIG. 3 by a plurality 120 of priority lists, each associated with a respective packet slot, and illustrated immediately beneath its associated packet slot. The association of priority lists with packet slots is indicated by arrows between each priority list and its associated packet slot. That is, priority list 1 122 is associated with packet slot 1, priority list 2 124 with packet slot 2, priority list 3 126 with slot 3, and priority list M 129 with packet slot M. Each priority list contains a plurality of entries each represented by a rectangle. The contents of each entry is an identifier (ID) representing a component signal as contained in the service table 130.

For example, the first entry ID1 in priority list 1 122 contains the identifier "1" representing the video signal component V from the first program source. This is represented in FIG. 3 by an arrow between the first entry ID1 in priority list 1 122 and the first entry VIDEO 1 in the service table 130. The second entry ID2 in priority list 1 122 contains an identifier "4" representing the video signal component (not shown in FIG. 1) of the second program source (also not shown). This is represented in FIG. 3 by an arrow between the second entry ID2 in priority list 1 122 and the fourth entry VIDEO 2 in the service table 130. Further entries (ID3 . . . ) in priority list 1 122 may, for example, similarly contain identifiers for all the other video signal components being broadcast.

Similarly, priority list 2 124 may, for example, contain entries identifying all of the audio component signals. That is, the first entry ID1 in priority list 2 124 represents the audio signal component A from the first program source and has the value 2 (represented by an arrow from ID 1 of priority list 2 124 to the second entry AUDIO 1 in the service table 130); the second entry ID2 represents the audio signal component from the second program source and has the value 5 (represented by an arrow from ID 2 of priority list 2 124 to the second entry AUDIO 2 in the service table 130); and so forth. Priority list 3 may, for example, contain entries identifying the video component signals similar to priority list 1—possibly with the video signal components having different positions in the priority list. The next priority list (not shown) may, for example, include entries identifying all the closed captioning component signals, followed by another video signal component priority list, and so forth. The final priority list M may, for example, contain entries identifying the PCR and scrambling keys component signal N−1 and the tables signal component.

The number of packet slots in the group, and the assignment of component signals to associated priority list for each of the packet slots is best made by considering the respective data rates of each of the component signals. That is, component signals having higher data rates (e.g. video signal components) will be assigned to more than one priority list, and thus to more than one packet slot in the group, while component signals having lower data rates (e.g. audio signal components) will be assigned to only one priority list. One skilled in the art of digital data transmission will understand how to assign component signals to priority lists to optimize the data throughput of the system, while minimizing the probability of a null packet being inserted into the packet stream.

In operation, whenever a packet slot occurs, the scheduler controller 50 (of FIG. 1) traverses the priority list for that packet slot. The scheduler controller 50 extracts the identifier from the first entry in that priority list and places an identification signal representing that identifier on the ID signal lines of the control bus 22. The addressed FIFO buffer 10 responds by placing the signal from the full output terminal F of the FIFO 102 (of FIG. 2) on the ready signal line of the control bus 22. If the ready signal indicates that the addressed FIFO buffer 10 has sufficient data to form a packet, then the scheduler controller 50 waits for a start signal from the packetizer 30, and when the start signal is received, generates an enable signal on the enable signal line of the control bus 22. In response to this enable signal, the addressed FIFO buffer 10 produces the data for that packet slot, which is transmitted to the packetizer 30 via the data bus 20, all as described above.

If, on the other hand, the ready signal indicates that the addressed FIFO buffer 10 does not have sufficient data to form a packet, then the scheduler controller 50 extracts the identifier from the next entry in the priority list 120 for that packet slot and places a signal representing that identifier on the ID signal lines of the control bus 22, and waits for the ready signal from the newly addressed FIFO buffer 10. This continues until either a ready signal is received indicating that one of the addressed FIFO buffers 10 has sufficient data to form a packet, or the last entry in the priority list is processed, in which case a null packet is placed in the packet slot. Then the same procedure is followed for the priority list for the next packet slot.

A transport stream encoder using a data bus to couple input FIFO buffers to the packetizer provides the flexibility necessary to easily add more FIFO buffers to the encoder. A new FIFO buffer is coupled to the control and data busses and assigned an identifier which is different from the identifiers of the FIFO buffers already on the bus. In addition, a transport stream encoder according to the present invention can easily allow large numbers of FIFO buffers to be attached to the packetizer, and thus a large number of component signals to be transmitted over the transport link.

The hybrid scheme of allocating component signals to packet slots provides great flexibility. This permits the broadcaster to easily provide each component signal the throughput it requires, while minimizing the number of null packets transmitted.

What is claimed is:

1. A method for operating a transport stream encoder to produce a stream of packets carrying data representing a plurality of component signals, comprising the steps of:

partitioning the packet stream into successive groups containing a predetermined number of packet slots;

maintaining a plurality of priority lists, corresponding to respective packet slots within the groups of packet slots, each priority list containing a plurality of entries each entry identifying a respective one of the plurality of component signals;

for each one of the plurality of packet slots, traversing the plurality of entries in the priority list corresponding to the one of the plurality of packet slots;

for each one of the plurality of entries in the priority list corresponding to the one of the plurality of packet slots:
      determining if the component signal identified by the one of the plurality of entries can produce a packet; and
      if the component signal identified by the one of the plurality of entries can produce a packet, producing a packet containing data representing the identified component signal.

2. The method of claim 1 and further including the step of producing a null packet if none of the component signals identified by the plurality of entries in the priority list corresponding to the one of the plurality of packet slots can produce a packet.

3. The method of claim 1 wherein the maintaining step comprises the step of receiving data from a user for assigning entries to the plurality of entries in the plurality of priority lists.

4. The method of claim 1 wherein:

the maintaining step comprises the step of sequencing the plurality of entries in each of the plurality of priority lists in order from a first entry to a last entry; and the traversing step comprises the step of performing the determining and producing steps for the plurality of entries in order from the first entry to the last entry.

5. The method of claim 4 wherein the sequencing step comprises the step of placing the plurality of entries in each of the plurality of priority lists in priority order with the highest priority entry being the first entry and the lowest priority entry being the last entry.

6. The method of claim 1, in which the transport stream encoder includes a plurality of buffers coupled to respective sources of the plurality of component signals, each buffer having an output terminal producing a full signal indicating whether the FIFO buffer contains sufficient data to produce a packet, wherein the determining step comprises the steps of:

sensing the full signal of the buffer coupled to the source of the component signal identified by the one of the plurality of entries; and if the full signal indicates that the buffer contains sufficient data to produce a packet, determining that the component signal can produce a packet.

7. The method of claim 1, in which the transport stream encoder includes a plurality of buffers coupled to respective sources of the plurality of component signals, each buffer having an enable input terminal for conditioning the buffer to produce component signal data, wherein the producing step comprises the step of supplying an enable signal to the buffer coupled to the source of the component signal identified by the one of the plurality of entries.

8. The method of claim 7, in which the transport stream encoder further includes a packetizer, having a start signal output terminal for generating a start signal at the beginning of each packet slot, a data input terminal for receiving component signal data, and a data output terminal for producing the stream of packets; and in which each of the plurality of buffers further includes a data output terminal, coupled to the data input terminal of the packetizer, for producing the component signal data; wherein the producing step comprises the steps of:

waiting until a start signal is received from the packetizer; then supplying the enable signal to the buffer coupled to the source of the component signal identified by the one of the plurality of entries.

9. A transport stream encoder, comprising:

a plurality of buffers coupled to respective sources of component signals, each having an output terminal producing a full signal indicating whether it contains sufficient data to produce a packet;

a packetizer, coupled to the plurality of buffers, for producing a packet stream partitioned into successive groups containing a predetermined number of packet slots;

a memory for storing a plurality of priority lists, corresponding to respective packet slots within the groups of packet slots, each priority list containing a plurality of entries each identifying a respective one of the plurality of component signals; and a scheduler controller, coupled to the plurality of buffers and to the memory, for determining the contents of each one of the plurality of packet slots by traversing each one of the plurality of entries in the priority list corresponding to the one of the plurality of packet slots, sensing the full signal from the buffer coupled to the source of the component signal identified by the one of the plurality of entries, if the full signal indicates that the buffer coupled to the source of the component signal identified by the one of the plurality of entries contains sufficient data to produce a packet, conditioning the packetizer to produce a packet containing data representing the identified component signal.

10. The method of claim 9 and further including the step of conditioning the packetizer to produce a null packet if none of the buffers coupled to the respective sources of the component signals identified by the plurality of entries in the priority list corresponding to the one of the plurality of packet slots contains sufficient data to produce a packet.

11. The encoder of claim 9 wherein:

the packetizer has an output terminal producing a start signal indicating the beginning of a packet slot;

each buffer has an input terminal for receiving an enable signal which conditions the buffer to produce component signal data; and the scheduler controller is responsive to the start signal for producing an enable signal for the buffer whose full signal indicates that it contains sufficient data to produce a packet.

12. The encoder of claim 9 further comprising a source of user information for maintaining the plurality of priority lists stored in the memory.

13. The encoder of claim 12 wherein the user information source comprises a microprocessor.

14. The encoder of claim 13 wherein the scheduler controller operates independently of the microprocessor and is coupled directly to the memory.

15. The encoder of claim 13 wherein:

the scheduler controller is coupled to the microprocessor by a system bus, and operates as an I/O adapter under control of the microprocessor; and the memory is coupled to the microprocessor via the system bus.

16. The encoder of claim 9, wherein:

each of the plurality of buffers has a data output terminal producing component signal data;

the packetizer has a data input terminal for receiving component signal data;, the encoder further comprising:

a data bus coupled in common to the respective data output terminals of the FIFO buffers and the data input terminal of the packetizer.

17. The encoder of claim 9 wherein:

each buffer is identified by a predetermined unique value, has an identification input terminal for receiving an identification signal, and is responsive to an identification signal having the predetermined unique value for producing the full signal;

the memory stores with each one of the plurality of entries in the plurality of priority tables the predetermined unique value for the buffer coupled to the source of the component signal identified by the one of the plurality of entries; and the scheduler controller has an identification output terminal coupled to the respective identification input terminals of the plurality of buffers and produces an identification signal having the value of the one of the plurality of entries in the one of the priority tables being traversed.

\* \* \* \* \*